(12) United States Patent
Colenbrander

(10) Patent No.: US 11,731,043 B2
(45) Date of Patent: Aug. 22, 2023

(54) ADAPTIVE GRAPHICS FOR CLOUD GAMING

(71) Applicant: Sony Interactive Entertainment Inc., Tokyo (JP)

(72) Inventor: Roelof Roderick Colenbrander, Costa Mesa, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/688,369

(22) Filed: Nov. 19, 2019

(65) Prior Publication Data

US 2021/0146240 A1  May 20, 2021

(51) Int. Cl.
*A63F 13/355* (2014.01)
*A63F 13/335* (2014.01)
*A63F 13/358* (2014.01)

(52) U.S. Cl.
CPC .......... *A63F 13/355* (2014.09); *A63F 13/335* (2014.09); *A63F 13/358* (2014.09); *A63F 2300/538* (2013.01)

(58) Field of Classification Search
CPC .................. A63F 13/355; A63F 13/358; A63F 2300/538; A63F 13/335; H04L 43/0876; H04L 43/0858; H04L 65/602; H04L 65/80; H04N 21/234363; H04N 21/234381; H04N 21/2402; H04N 21/4781
See application file for complete search history.

(56) References Cited

U.S. PATENT DOCUMENTS

| | | | | |
|---|---|---|---|---|
| 2010/0304860 | A1* | 12/2010 | Gault | A63F 13/12 463/31 |
| 2011/0263332 | A1* | 10/2011 | Mizrachi | A63F 13/358 463/42 |
| 2013/0128947 | A1* | 5/2013 | Fryer | H04N 21/2343 375/240.01 |
| 2013/0268583 | A1* | 10/2013 | Sheppard | H04L 67/01 709/203 |
| 2013/0307847 | A1* | 11/2013 | Dey | G06T 1/00 345/419 |

(Continued)

FOREIGN PATENT DOCUMENTS

WO   WO-2005061067 A1 *  7/2005  .......... A63F 13/358

OTHER PUBLICATIONS

Game accessibility guidelines; posted Feb. 12, 2018 https://web.archive.org/web/20180212231749/http://gameaccessibilityguidelines.com/include-assist-modes-such-as-auto-aim-and-assisted-steering/ (Year: 2018).*

(Continued)

*Primary Examiner* — James S. McClellan
*Assistant Examiner* — Ross A Williams
(74) *Attorney, Agent, or Firm* — Penilla IP, APC

(57) ABSTRACT

A method is provided, including the following operations: executing a video game by a cloud game machine, the execution of the video game includes rendering gameplay video; processing the gameplay video by a streaming server for streaming over a network to a client device; monitoring connection quality over the network between the streaming server and the client device; responsive to detecting a change in the connection quality between the streaming server and the client device, then adjusting the rendering of the gameplay video by the cloud game machine.

10 Claims, 10 Drawing Sheets

(56) References Cited

U.S. PATENT DOCUMENTS

| | | | | |
|---|---|---|---|---|
| 2014/0028779 | A1* | 1/2014 | Minemura | H04L 65/1069 |
| | | | | 348/14.02 |
| 2014/0189091 | A1* | 7/2014 | Tamasi | H04L 43/0858 |
| | | | | 709/224 |
| 2015/0011311 | A1* | 1/2015 | Relan | A63F 13/30 |
| | | | | 463/31 |
| 2016/0044384 | A1* | 2/2016 | Edenbrandt | H04N 21/64738 |
| | | | | 725/116 |
| 2016/0082354 | A1* | 3/2016 | Wakeford | A63F 13/77 |
| | | | | 463/29 |
| 2016/0110841 | A1* | 4/2016 | Kamiyama | H04N 21/25435 |
| | | | | 345/503 |
| 2016/0315842 | A1* | 10/2016 | Boss | H04L 65/80 |
| 2017/0236527 | A1* | 8/2017 | Dimitriadis | G10L 15/20 |
| | | | | 704/226 |
| 2018/0293697 | A1* | 10/2018 | Ray | G06F 9/3887 |
| 2018/0309999 | A1* | 10/2018 | Kopietz | A63F 13/355 |
| 2019/0164518 | A1* | 5/2019 | Dimitrov | G02B 27/017 |
| 2020/0152234 | A1* | 5/2020 | Sharma | H04N 21/8358 |
| 2020/0287993 | A1* | 9/2020 | Schweizer | H04L 67/38 |

OTHER PUBLICATIONS

"How to Use Radeon Game Advisor" video (herein referred as "Radeon") posted Jul. 9, 2019. https://www.youtube.com/watch?v=sqWbDVDoolc (Year: 2019).*

Hemmati et al; "Game as Video: Bit Rate Reduction through Adaptive Object Encoding" (Year: 2013).*

* cited by examiner

ADAPTIVE GRAPHICS FOR CLOUD GAMING

FIELD OF THE DISCLOSURE

The present disclosure relates to systems and methods for adaptive graphics for cloud gaming.

BACKGROUND

Description of the Related Art

A current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

A continuing trend in the video game industry is the increased sophistication of graphics and the availability of computing resources to meet the demands of modern game engines. As video games evolve, their resolutions and frame rates continue to increase, enabling rendering of very realistic and detailed virtual environments. Additionally, the popularity of cloud gaming continues to grow, and the shift to cloud executed video games enables even greater access to high quality gaming experiences.

Broadly speaking, present day cloud gaming architectures rely upon streaming of existing console or PC game titles. Existing unmodified games are used, and without their "knowledge," their video and audio are captured and streamed to a user. During such streaming, care is taken to offer the user the best experience based on their Internet connection. If the connection is poor, the image quality can be reduced by changing video encoder settings such as video resolution, frame rate, or compression settings. However, such adjustments are performed on the video/audio that has already been output by the video game.

It is within this context that embodiments of the disclosure arise.

SUMMARY OF THE DISCLOSURE

Implementations of the present disclosure provide systems and methods for adaptive graphics for cloud gaming. While current cloud gaming systems address varying Internet conditions by changing video encoder settings, such changes only affect existing video/audio that has already been generated by the video game, and does not involve the video game itself. Better image quality and an improved user experience can be achieved if the video game is involved in quality adjustments. For example, the video game can render lower resolution textures that are easier to compress) or not render unnecessary objects at all. Implementations of the present disclosure provide better cooperation between the video game and the video streaming solution in order to obtain a higher quality stream to the user.

In some implementations, a method is provided, including the following operations: executing a video game by a cloud game machine, the execution of the video game includes rendering gameplay video; processing the gameplay video by a streaming server for streaming over a network to a client device; monitoring connection quality over the network between the streaming server and the client device; responsive to detecting a change in the connection quality between the streaming server and the client device, then adjusting the rendering of the gameplay video by the cloud game machine.

In some implementations, processing the gameplay video by the streaming server includes encoding the gameplay video in a compressed video format.

In some implementations, monitoring connection quality includes monitoring one or more of bandwidth or latency.

In some implementations, monitoring connection quality includes monitoring packet loss occurring during the streaming of the gameplay video.

In some implementations, adjusting the rendering of the gameplay video by the cloud game machine includes adjusting a frame rate or a resolution for the gameplay video.

In some implementations, adjusting the rendering of the gameplay video by the cloud game machine includes adjusting a level of detail for the rendering of the gameplay video.

In some implementations, adjusting the rendering of the gameplay video by the cloud game machine includes adjusting an amount of content for inclusion in the gameplay video.

In some implementations, the change in the connection quality is defined by a degradation in the connection quality; wherein adjusting the rendering of the gameplay video by the cloud game machine is configured to reduce a bit rate of the streaming of the gameplay video over the network.

In some implementations, the change in the connection quality is defined by an improvement in the connection quality; wherein adjusting the rendering of the gameplay video by the cloud game machine is configured to increase a bit rate of the streaming of the gameplay video over the network.

In some implementations, detecting the change in the connection quality triggers transmission of a message from the streaming server to the cloud game machine, and wherein the adjusting of the rendering of the gameplay video by the cloud game machine is responsive to said message.

In some implementations, a method is provided, including the following method operations: executing a video game by a cloud game machine, the execution of the video game includes rendering gameplay video; processing the gameplay video by a streaming server for streaming over a network to a client device, wherein processing the gameplay video by the streaming server includes encoding the gameplay video in a compressed video format; monitoring connection quality over the network between the streaming server and the client device, wherein monitoring connection quality includes monitoring packet loss occurring during the streaming of the gameplay video; responsive to detecting a change in the connection quality between the streaming server and the client device, then adjusting the rendering of the gameplay video by the cloud game machine, wherein adjusting the rendering of the gameplay video by the cloud game machine includes adjusting a frame rate or a resolution for the gameplay video.

In some implementations, a system is provided, including the following: a cloud game machine that executes a video game, the execution of the video game includes rendering gameplay video; a streaming server that processes the gameplay video for streaming over a network to a client device, wherein the streaming server monitors connection quality over the network between the streaming server and the client device; wherein responsive to detecting a change in the connection quality between the streaming server and the client device, then the rendering of the gameplay video is adjusted by the cloud game machine.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Implementations of the present disclosure improve the audio/video quality of a cloud gaming session by including the video game into the quality adjustment feedback loop. Normally the quality is adjusted based on fluctuations in the Internet connection in terms of bandwidth, latency and packet loss. In existing cloud gaming systems, typically the game is not involved in these adjustments. However, by involving the video game in adjusting the quality of the video/audio, more intelligent decisions can be made to improve the quality and responsiveness of a cloud gaming session.

Broadly speaking, the Internet connection between a client and a server fluctuates in available bandwidth, latency and packet loss. In current cloud gaming systems, during a session the connection is monitored and the audio/video quality is adjusted based on this. Adjustments are needed, for example, when a user's bandwidth becomes lower than the bandwidth configured for the audio and video encoders server-side. Without adjustments, the user wouldn't be able to receive all the data as their connection couldn't handle it, which would result in packet loss and a degraded experience. Also, if the available bandwidth goes up, quality can be improved by increasing the encoder bitrate.

At present, quality adjustment works by means of a feedback loop between the client and server. There are a few settings which can be adjusted such as the bitrate of the audio or video encoder, frame rate and video resolution. However, these knobs are suboptimal because the streaming software receives completed audio or video frames to encode. While the server can adjust resolution, it does so by scaling the already rendered image; and while it can adjust the frame rate, it does so by throwing away video frames. These adjustments are less than ideal because they do not affect the original native rendering of the video and audio, but only further process video and audio that has already been rendered.

However, better results can be achieved by involving the video game itself in quality adjustments. Accordingly, implementations of the present disclosure extend the streaming quality feedback loop to involve the video game itself. The existing feedback loop can be extended with a channel from the streaming software to the video game. This channel can be used to trigger quality adjustments, but also for other purposes like pausing the game or the game giving the streaming software hints (e.g. on scene change, which is generally difficult for a video encoder to handle).

Figure 1:
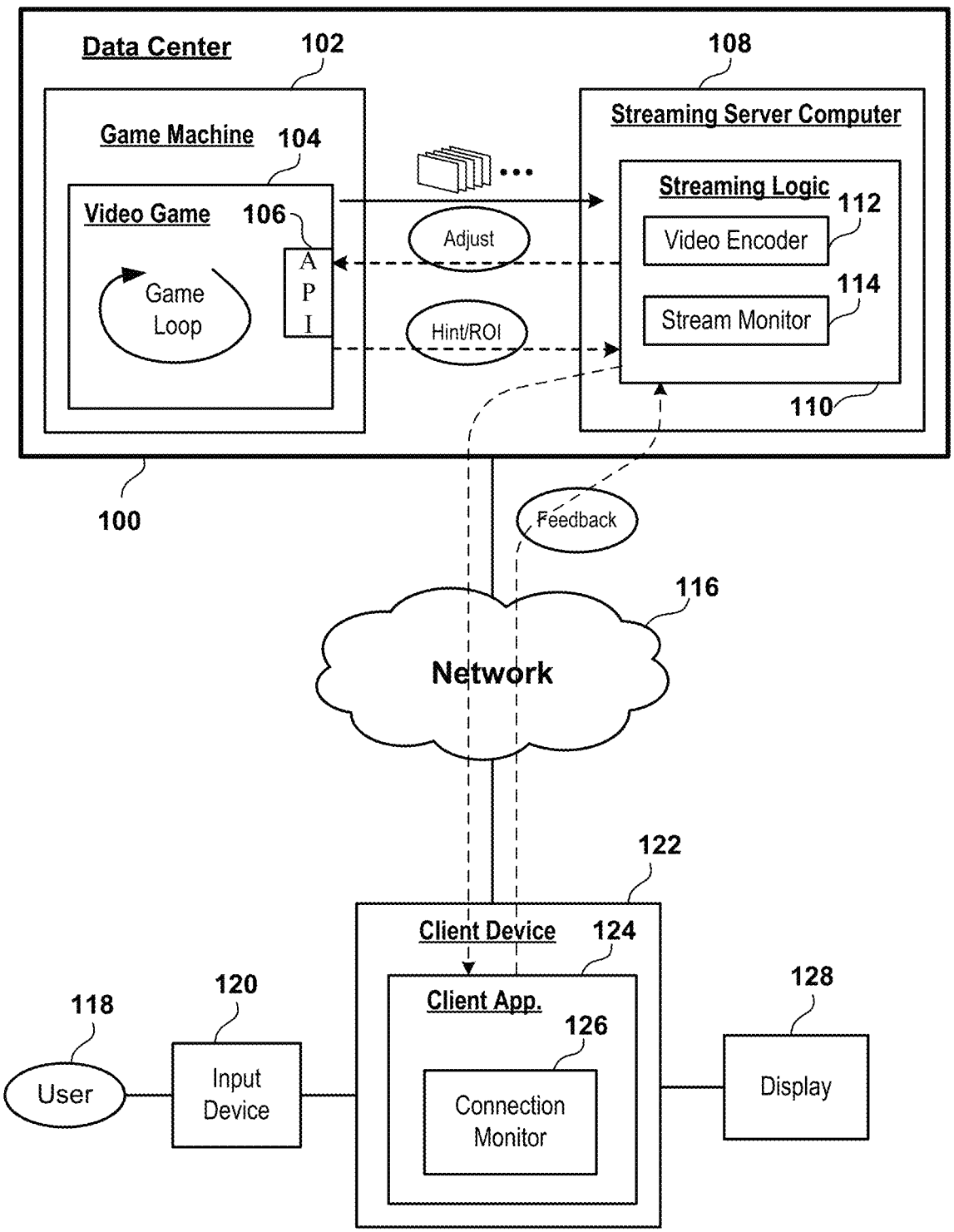
FIG. 1 conceptually illustrates a cloud gaming system that is configured to involve the video game itself in video/audio quality adjustments based on network conditions, in accordance with implementations of the disclosure.

FIG. 1 conceptually illustrates a cloud gaming system that is configured to involve the video game itself in video/audio quality adjustments based on network conditions, in accordance with implementations of the disclosure. As shown, the cloud gaming infrastructure is typically situated in a data center 100, and consists of a game machine 102 which executes a video game 104, and a streaming server computer 108 which implements streaming logic/server 110. The game machine 102 is a device having sufficient hardware to execute the video game 104. By way of example without limitation, the game machine may be a game console or its hardware equivalent (e.g. bladed version), one or more server computers, or any other device capable of providing the appropriate execution environment for the video game 104. In some implementations, the game machine implements a virtual machine (e.g. using a hypervisor), a cloud compute, or other virtualized resource (e.g. including an operating system) upon which the video game is executed.

Broadly speaking, the executing video game 104 generates video and audio that reflects the gameplay of the video game (e.g. a rendering of a virtual environment of the video game, such as a perspective of a virtual character, and the accompanying sound effects and soundtrack), for example in a native uncompressed format. The streaming logic/server 110 encodes the video and audio in a compressed format before streaming it over a network 116 to a client device 122. To this end, the streaming logic 110 includes a video encoder 112 that is capable of encoding the video in a compressed video format, e.g. using a video codec, or in accordance with a video compression protocol. More specifically, the streaming logic may adjust the encoding of the video or audio (e.g. adjusting the bit rate, frame rate, resolution, etc.) based on network conditions or feedback from the client. In some implementations, the video encoder 112 also includes an audio encoder that encodes the audio in a compressed audio format, e.g. using an audio codec, or in accordance with an audio compression protocol. In some implementations, the audio encoder is separate from the video encoder 112.

As noted, the encoded video/audio is streamed over the network 116 to the client device 122. By way of example without limitation, the client device 122 can be a game console, personal computer, laptop, tablet, mobile phone, or any other device capable of streaming gameplay of a video game from a cloud gaming provider as in the present disclosure. The client device 122 executes a client application 124 that receives the encoded video/audio, and decodes the video for rendering to a display 128 viewed by a user 118, and further decodes the audio for playback through one or more speakers to be heard by the user 118. The display 128 and/or the speakers can be integrated with the client device or separate from the client device 122 in various implementations. In some implementations, the display 128 is a television, monitor, screen, projector, or other device through which video can be viewed by the user 118. Additionally, the user 118 may operate an input device 120 to provide input to the video game 104. By way of example without limitation, the input device 120 can be a game controller, motion controller, keyboard, mouse, touchpad, trackball, camera, depth camera, microphone, or any other sensing device through which interactive input for the video game can be supplied.

As shown, the streaming logic 110 includes or invokes a stream monitor 114 that is configured to monitor the quality of streaming to the client device 122. By way of example without limitation, the stream monitor 114 may monitor packet loss or retransmits, positive acknowledgements from the client device (e.g. for data/packets received by the client device), negative acknowledgements from the client device (e.g. for data/packets not received by the client device), network latency, ping times to the client device 122, network bandwidth, or any other indicator of the quality of data transmission between the streaming logic 110 and the client device 122.

Additionally, in some implementations, the client application 124 may include or invoke a connection monitor 126. The connection monitor 126 can be configured to monitor similar network conditions as the stream monitor 114 described above, but from the client side, such as packet/data loss, network bandwidth, network latency, etc. In some implementations, the client application 114 sends feedback about such network conditions to the streaming logic 110.

In response to sensed network conditions such as network latency or network bandwidth conditions, the streaming logic 110 is configured to extend the streaming quality feedback loop back to include the video game itself. That is, the streaming logic 110 is configured to communicate to the video game 104 to adjust some aspect of the video game's execution, such as its video/audio rendering or gameplay, so as to compensate for changing network conditions. For example, this may include adjusting the video game's video/audio rendering in a manner that reduces the bandwidth requirement of the game stream. In some implementations, the streaming logic 110 may perform adjustments to the video encoding in addition to the adjustments to those being made by the video game 114. Additionally, the video game 104 may communicate to the streaming logic 110, and/or to the client device 122 via the streaming logic 110, information relevant for the video/audio encoding or decoding, such as information about regions of interest in the video or hints about upcoming events in the video such as scene changes. Additionally, the communication may establish a path from video game 104, via the streaming logic 110, to client application 114, for other purposes such as sending information for client-side rendering or interface operation.

To facilitate the communication between the video game 104 and the streaming logic 110, the video game 104 may expose an API 106 or a shared memory or socket, by way of example without limitation. In some implementations, the streaming logic 110 accesses the API 106 of the video game 104 in order to transmit messages requesting adjustment of the video/audio output by the video game 104. Generally speaking, the video game 104 executes a game loop, which typically involves processing inputs (e.g. user interactive input such as controller/motion/voice inputs, network requests or inputs from other players in a multiplayer game, etc.), updating the game state, and rendering the video/audio using the current game state. Hence, in various implementations, the messages from the streaming logic 110, which may be received through the API 106 or socket, can constitute another input to the game loop of the game, and/or can be processed to affect the rendering of the video/audio that is based on the current game state.

Furthermore, the communication between the streaming logic 110 and the video game 104 can be part of a feedback loop, wherein adjustments made by the video game 104 are implemented, the results of such adjustments are monitored (e.g. by continuing to monitor the stream quality), and additional adjustments are made if necessary. For example, if the streaming logic 110 causes the video game 104 to reduce the video/audio quality in response to degraded network conditions, it might not be fully known whether the effect is significant enough to overcome the degraded network conditions until after the video encoding through the streaming logic's video encoder 112 is performed. And thus if the effect is not large enough, it may take additional instruction from the streaming logic 110 to the video game 104 to further reduce the video quality. In a sense, it may take several video frames to assess the situation, and multiple rounds of adjustment by the video game 104 before appropriate video/audio quality levels are reached. It will be appreciated that the opposite scenario wherein network conditions improve can be handled in a similar manner, but with the streaming logic instructing the video game to increase video/audio quality.

While implementations of the present disclosure and generally drawn to configurations wherein the streaming logic 110 is implemented on a separate computing device than the video game 104, it will be appreciated that in other implementations, the functionality of the streaming logic 110 as described herein can be implemented on the same device as the video game 104 (such as game machine 102), or in some implementations, may even be logically incorporated as part of the video game 104.

Figure 2:
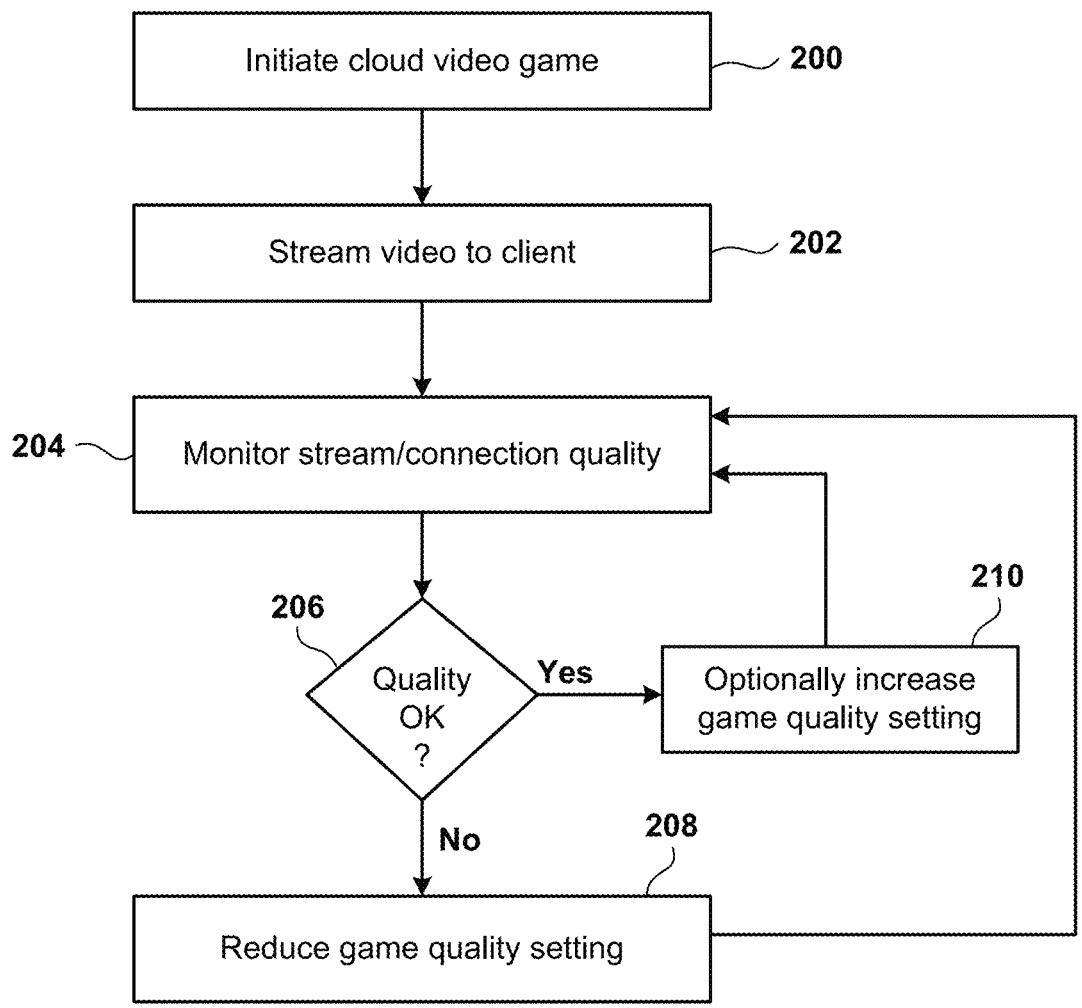
FIG. 2 conceptually illustrates a game stream quality feedback loop wherein video/audio quality is adjusted based on stream quality, in accordance with implementations of the disclosure.

FIG. 2 conceptually illustrates a game stream quality feedback loop wherein video/audio quality is adjusted based on stream quality, in accordance with implementations of the disclosure. At method operation 200, a cloud video game is initiated, which can include assigning the user to a data center and cloud game machine, executing a cloud video game on the cloud game machine, setting up connections between a streaming server and the user's client device, etc.

At method operation 202, video/audio of the executing video game is streamed to the client device, and interactive gameplay of the cloud video game commences as the user interacts with the streamed video/audio, e.g. using a controller device or other input device.

At method operation 204, the game stream quality or connection quality or network condition is monitored. By way of example without limitation, this may entail monitoring a condition between the data center from which the game is streamed and the client device, such as packet loss, latency, bandwidth, etc.

At method operation 206 it is determined whether the game stream quality is acceptable or not, and further whether the video game's quality settings should be increased or decreased. Broadly speaking, if the game stream quality falls below a given threshold, then at method operation 208, the video game is instructed to reduce a game quality setting. By way of example without limitation, the game stream quality falling below a given threshold can be defined by various measures, such as packet loss exceeding a predefined threshold, bandwidth falling below a predefined threshold, latency exceeding a predefined threshold, etc. The resulting reduction in game quality setting can include various measures described in further detail herein, such as reducing resolution or framerate, reducing texture quality, reducing detail settings, reducing the scope of the virtual environment that is rendered, etc.

Similar to the above, if the game stream quality rises above a given threshold, then no action may be taken in some implementations, whereas in other implementations, then at method operation 210, the video game is optionally instructed to increase a game quality setting. By way of example without limitation, the game stream quality rising above a given threshold can be defined by various measures, such as packet loss falling below a predefined threshold, bandwidth rising above a predefined threshold, latency falling below a predefined threshold, etc. When performed, the resulting increase in game quality setting can include various measures described in further detail herein, such as increasing the resolution or framerate, increasing texture quality, increasing detail settings, increasing the scope of the virtual environment that is rendered, etc.

In view of the above, it will be appreciated that in some implementations, the game stream quality can have a target range, wherein the game quality setting is adjusted upward or downward when the game stream quality is above (an upper limit of) or below (a lower limit of) the target range, respectively.

It will be appreciated that after the game quality setting is increased or decreased, then the method returns to method operation 204, wherein the stream quality is further monitored, and additional adjustments made as needed, thus forming a feedback loop that optimizes the stream quality in view of network conditions that may change, and which does so by involving the video game to adjust aspects of the video game's rendering, logic, or other settings.

Figure 3:
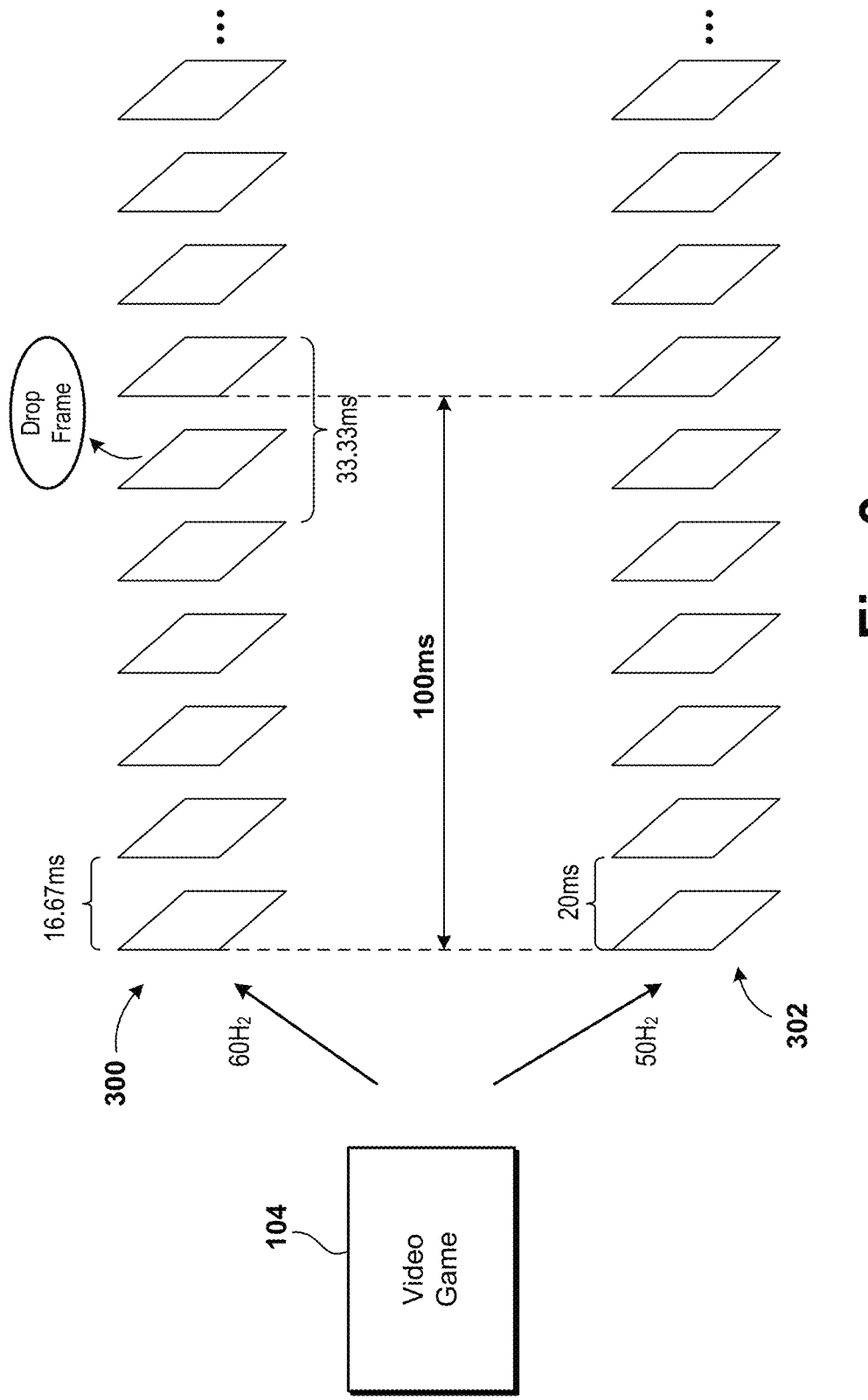
FIG. 3 conceptually illustrates a reduction in frame rate as performed natively by an executing video game, versus being performed by a streaming server after being rendered by the video game, in accordance with implementations of the disclosure.

FIG. 3 conceptually illustrates a reduction in frame rate as performed natively by an executing video game, versus being performed by a streaming server after being rendered by the video game, in accordance with implementations of the disclosure. It will be appreciated that in accordance with implementations of the disclosure, one way to reduce the amount of data required for streaming video is to reduce the frame rate of the video. Existing video encoders can reduce the frame rate; however, this works best when going between even multiples, e.g. receive 60 frames-per-second (FPS) video and encode it at 30 FPS (and possibly perform interpolation at the client), so that the spacing between frames remains constant.

However, dropping for 60 FPS to 30 FPS may be more of a reduction in data than is necessary in view of available bandwidth. However, if attempting to reduce from 60 FPS video to, for example, 50 FPS, then the video encoder may throw away every sixth frame; but then the spacing between the frames is not consistent, and so motion may not look smooth as the frame pacing is jerky. This scenario is conceptually illustrated by the series of image frames shown at reference 300, which have been generated by the video game 104 at 60 FPS, and having a 16.67 milliseconds (ms) spacing between each frame. However, if the video encoder drops every sixth frame, then the spacing between the preceding and proceeding frames of each dropped frame doubles to 33.33 ms, and no longer matches the spacing between the other frames. While client-side interpolation can be performed, such interpolation is only a best guess at the content of the missing frames, and may not match the actual dropped frames, possibly generating artifacts or producing artificial looking results.

Better results can be achieved if the video game itself natively reduces the frame rate to 50 FPS. This results in video frames as shown at reference 302, having a constant 20 ms spacing, with no inconsistency between frames. By having the video game itself adjust the video frame rate, any custom frame rate can be natively produced with even consistent spacing between frames. As noted, the frame rate can be adjusted in response to sensed network conditions or stream quality. For example, when stream quality or network conditions worsen, then the video game 104 can be caused to reduce its frame rate; and when stream quality or network conditions improve, then the video game 104 can be caused to increase its frame rate. By involving the video game in frame rate adjustments, this allows the game to adjust its internal timing and rate at which frames are delivered, which lifts the frame pacing limitations of current approaches, so that frame rate reductions (or increases) to other rates become possible.

Figure 4:
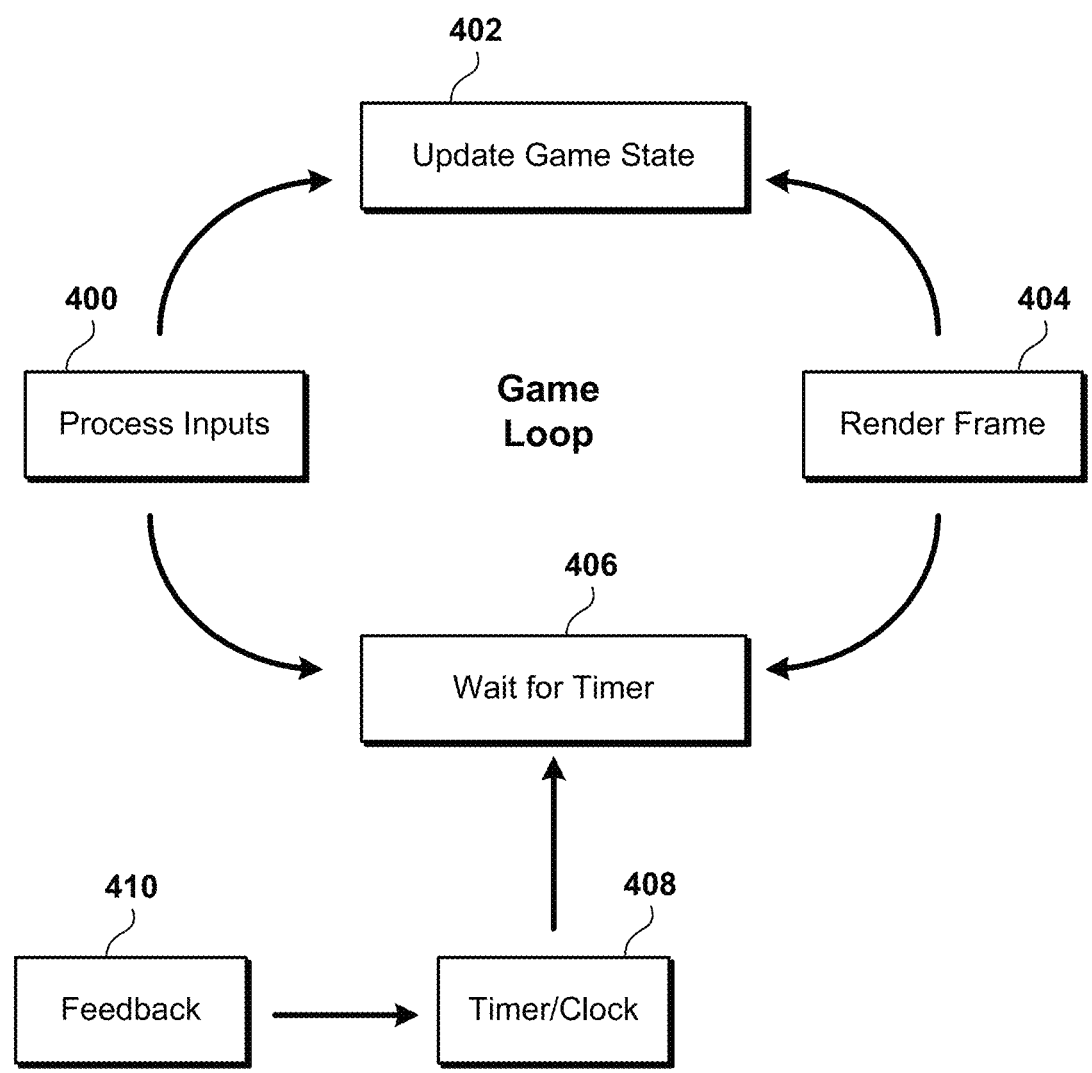
FIG. 4 conceptually illustrates a method for controlling or setting the frame rate of a video game, in accordance with implementations of the disclosure.

FIG. 4 conceptually illustrates a method for controlling or setting the frame rate of a video game, in accordance with implementations of the disclosure. Some existing PC/console games are configured to wait for the vertical sync (Vsync) of the monitor/display. That is, when the game passes a video frame to the GPU driver, then the GPU driver waits until the display starts the next line of a new image, and during this time the game loop is blocked until the GPU drivers accept the frame, thereby throttling the game loop and syncing it to the refresh rate of the display (e.g. 60 Hz, 120 Hz, etc.).

But in the case of a cloud video game, there is no actual display with which the cloud video game can be synchronized. Thus, in some implementations, a virtual Vsync is created that mimics the effect of an actual Vsync as described above. For example, in some implementations, an artificial Vsync timing signal is generated at a given frame rate, which is set or adjusted so as to achieve a desired effect on the video stream, such as reducing or increasing data usage. In some implementations, the effect of a virtual Vsync is created by GPU drivers.

In some implementations, an effect similar to using a Vsync timing signal as described above is achieved using a timer/clock, as shown in the illustrated implementation. The game loop is shown, wherein at method operation 400, inputs are processed, such as inputs generated from user interactive input through operation of an input device such as a game controller or other device. At method operation 402, the game state is updated, based on the game's logic such as a real-time physics engine or other process for determining the states of objects in the game's virtual environment.

At method operation 404, then the next video frame is rendered in accordance with the updated game state. At method operation 406, the game loop is paused and waits for a timer/clock 408 before continuing. The timer/clock 408 sets the interval between frames and is thus configured to throttle the game loop to a desired frame rate, based on feedback 410 which is received from the streaming logic as described above. In some implementations, the timer is provided by the operating system or the video game logic or game engine. While in the illustrated implementation, the game loop is shown to be paused by the timer after rendering of the last frame, in other implementations, the game loop may be paused after either of the other steps of processing inputs and updating the game state. By implementing a pause of the game loop, the frame rate of the video output from the game loop can be set to any custom rate, with consistent even spacing between video frames so that motion looks smooth.

Another aspect of the gameplay video that can be adjusted by the video game itself is the resolution of the video. In current cloud gaming systems, the streaming logic/server receives the completed video frames from the video game, and can only scale the video frames in dimensions and in color depth after the fact. However, improved quality can be achieved by instructing the video game itself to render the video at a lower resolution rather than scaling after the fact. For example, if a generated video frame is 1280×720 pixels in size, scaling it to other resolutions can be problematic if they are not good fractions of 1280×720, and text quality may suffer.

However, rather than scaling such a video frame after it has already been generated, the video game itself can be instructed to (or caused to) render the video frame at a different resolution, which enables the video game to optimize the rendering for the chosen resolution, e.g. so that text quality is optimized. In this way, the resolution can be dynamically changed to any arbitrary resolution without penalty from scaling after the fact. For example, when stream quality or network conditions worsen, then the video game 104 can be caused to decrease the video resolution; and when stream quality or network conditions improve, then the video game 104 can be caused to increase the video resolution.

In some implementations the video game can be instructed to change the aspect ratio of the video from an existing first aspect ratio to a (different) second aspect ratio (e.g. 16:9 to 4:3, etc.). Changing the aspect ratio can be useful for devices with displays whose orientation may change, such as mobile devices (e.g. cell phones, tablets, etc.) or others in which the user may rotate the display during typical operation. Thus, in some implementations, sensed rotation (or change in orientation) of the display may trigger the streaming logic to instruct the video game to change the aspect ratio. In this way, the video is delivered from the video game itself with a suitable aspect ratio for the way the display is being viewed, rather than relying on the streaming logic to alter the aspect ratio after the video has already been generated. It will be appreciated that changing the aspect ratio by the video game can entail adjusting the field of view that is rendered through the video, such as adjusting horizontal/vertical angular fields of view. In some implementations the aspect ratio is changed to match the full-screen area of the display with the correct or preferred orientation for viewing by the user.

In some implementations, detecting device rotation (or change in orientation, e.g. portrait to landscape or vice versa) can trigger any of the other changes effected by the video game described elsewhere in the present disclosure.

In some implementations, detection of switching from one device to another can trigger adjustments performed by the video game, such as the above-mentioned changes in video resolution, frame rate, or aspect ratio. For example, if the user switches gameplay from a TV to a cell phone, then the system may detect this and change the video resolution, frame rate, or aspect ratio to suit the cell phone's display.

Figure 5:
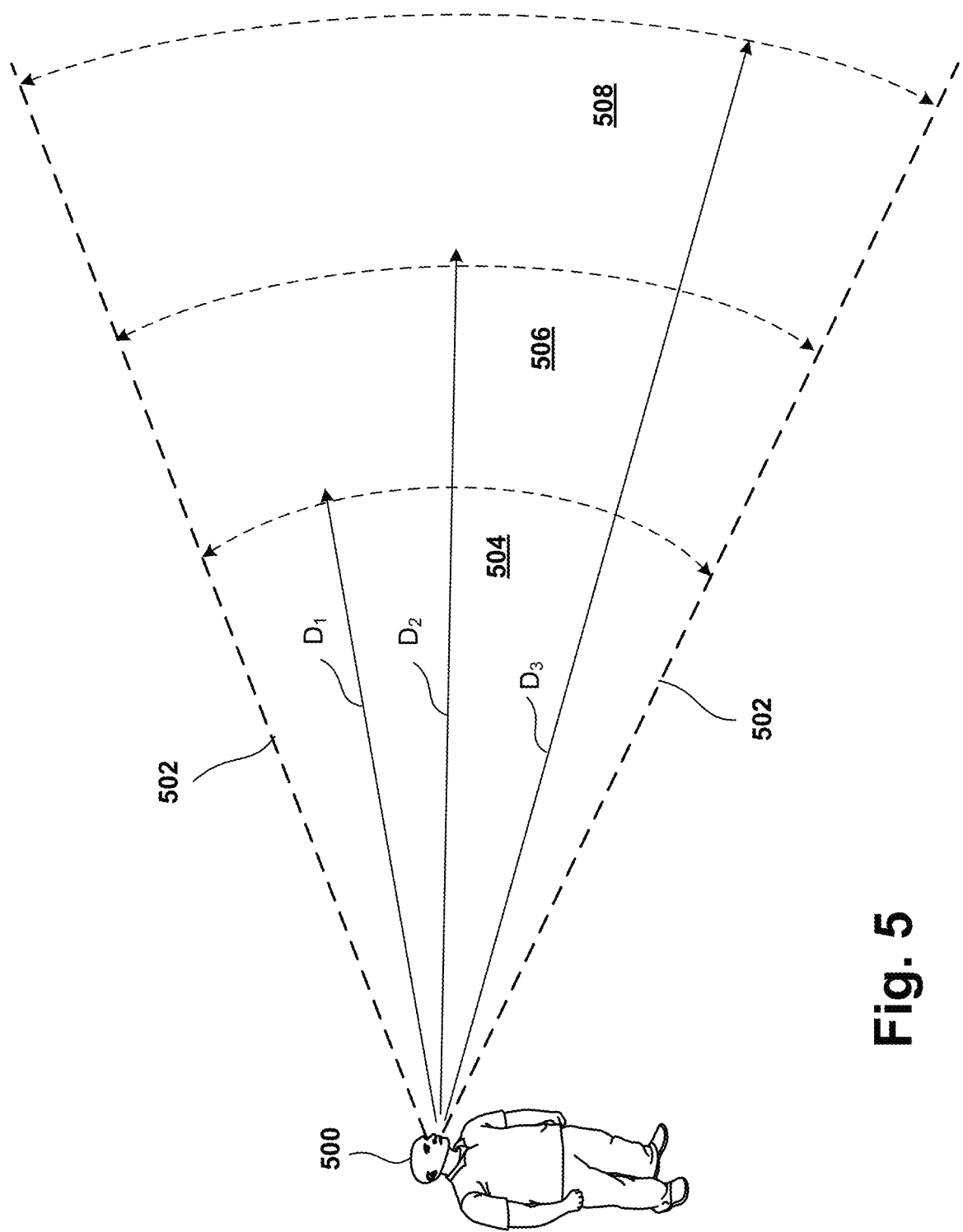
FIG. 5 conceptually illustrates variable rendering of content in a virtual environment, in accordance with implementations of the disclosure.

FIG. 5 conceptually illustrates variable rendering of content in a virtual environment, in accordance with implementations of the disclosure. In some implementations, another aspect which can be adjusted by the video game itself, e.g. in response to feedback regarding stream quality or network conditions, is the amount of content in a virtual environment that is rendered or shown in the video frames. One way of accomplishing this is by adjusting the viewing distance in the virtual environment.

For example, in the illustrated implementation, a virtual character 500 is conceptually shown in a virtual environment. The view of the virtual environment that is rendered for viewing by the user of the video game can be a portion falling within a field of view 502 that is from the perspective of the virtual character 500 (and having a view direction in the virtual environment that may be controlled by the user). Commonly, the field of view 502 is defined by a horizontal angular amount and vertical angular amount that is to be rendered. At a given time, the view of the virtual environment that is rendered may extend from the virtual character's 500 location to a depth D2 (or radius or distance) within the virtual environment. That is, objects in the virtual environment falling within the field of view 502 and within the depth D2 (i.e. within the regions 504 and 506 in the illustrated implementation) will be rendered in video frames output by the video game. Whereas, objects that are beyond the depth D2, such as objects falling within the region 508, will not be rendered. This effectively limits the distance at which objects in the virtual environment will be rendered for viewing.

In some implementations, for example in response to worsening stream quality or network conditions, the depth of rendering may be reduced, so as to render fewer objects from the virtual environment. For example, the depth may be reduced from D2 to a depth D1 as shown in the illustrated implementation. And thus in this condition, then the objects in the region 504 are rendered, said objects falling within the field of view 502 and within the depth D1. Whereas objects which are beyond the depth D1, such as those in regions 506 and 508, are not rendered for viewing by the user.

In some implementations, for example in response to improving stream quality or network conditions, the depth of rendering may be increased, so as to render a greater number of objects from the virtual environment. For example, the depth may be increased from D2 to a depth D3 as shown in the illustrated implementation. And thus in this condition, then the objects in the regions 504, 506, and 508 are all rendered, as said objects fall within the field of view 502 and within the depth D3. It will be appreciated that objects which are beyond the depth D3 will not be rendered for viewing by the user.

It will be appreciated that by adjusting the amount of virtual objects in a scene that are rendered in video frames by the video game, then the complexity of the video frames are increased or decreased, which consequently changes the amount of data bandwidth needed to faithfully transmit the video. While in the above-described implementation, the amount of virtual objects included in the view has been determined based on distance or depth, it will be appreciated that other ways of adjusting the amount of virtual objects to be rendered can be employed. For example, in some implementations, certain types or classes of objects can be included/excluded in the rendering based on stream quality and/or network conditions. In some implementations, objects are assigned a priority ranking or priority value, which defines their prioritization for inclusion in rendered views of the virtual environment. That is, as the amount of objects to be included in rendered video frames is reduced, then the order in which objects are dropped goes from lower priority to higher priority objects. Or conversely, when the amount of objects to be rendered is increased, then the order in which objects are added goes from higher to lower priority objects.

Thus, virtual objects can be turned on or off with respect to their inclusion in rendered image frames of the virtual environment. And objects with the lowest rendering priority will be dropped from the frame rendering first when network conditions worsen or stream quality degrades. It will be appreciated that generally, it is expected that objects that are excluded from being rendered will be objects whose removal does not significantly affect gameplay.

Another aspect which can be adjusted by the video game itself is the image quality. For example, in case of degraded network conditions, the goal of adjusting the image quality would be to adjust the scene complexity in order to obtain video frames that are easier to encode. The video game can be instructed to adjust the image quality in response to a given network condition. This can include adjusting the quality of textures applied to surfaces in the virtual environment. High quality textures can be very complicated to encode, and thus by reducing the quality of textures, then this reduces the amount of details on surfaces in the virtual environment, rendering them simpler to encode and reducing the bandwidth of the video being streamed. In some implementations, the resolution of textures could be adjusted in response to monitored network conditions. For example, texture resolution may be reduced (e.g. 4K×4K to 1K×1K textures) in response to reduced network bandwidth. This will cause textures to look less sharp, but will be much easier for the encoder to encode, and may have fewer encoding artifacts yielding a better overall user experience than if higher resolution textures were simplified at the encoder level.

In some implementations, the color depth or color space or color gamut or number of colors used for textures is adjusted. For example, such color parameters can be reduced or adjusted down in response to reduced bandwidth, or scaled back up in response to increased bandwidth.

In some implementations, the number of polygons or points used to model a given surface or object in the virtual environment could be adjusted (e.g. decreased in response to reduced network bandwidth).

In some implementations, lighting effects, particle effects, fog effects, reflections, or any other rendering parameter can be simplified or reduced in response to reduced network bandwidth or stream quality. In some implementations, the video game may not render certain geometry (e.g. reducing the amount or detail level of vegetation in an outdoor scene).

In some implementations, depending on the game context or functionality, the game could make decisions about what visual content/context to provide based on network conditions such as bandwidth. For example, for a character walking outside in a forest with fog, the game can be configured to increase the amount of fog so that user is not able to see as far in the virtual environment.

Figure 6:
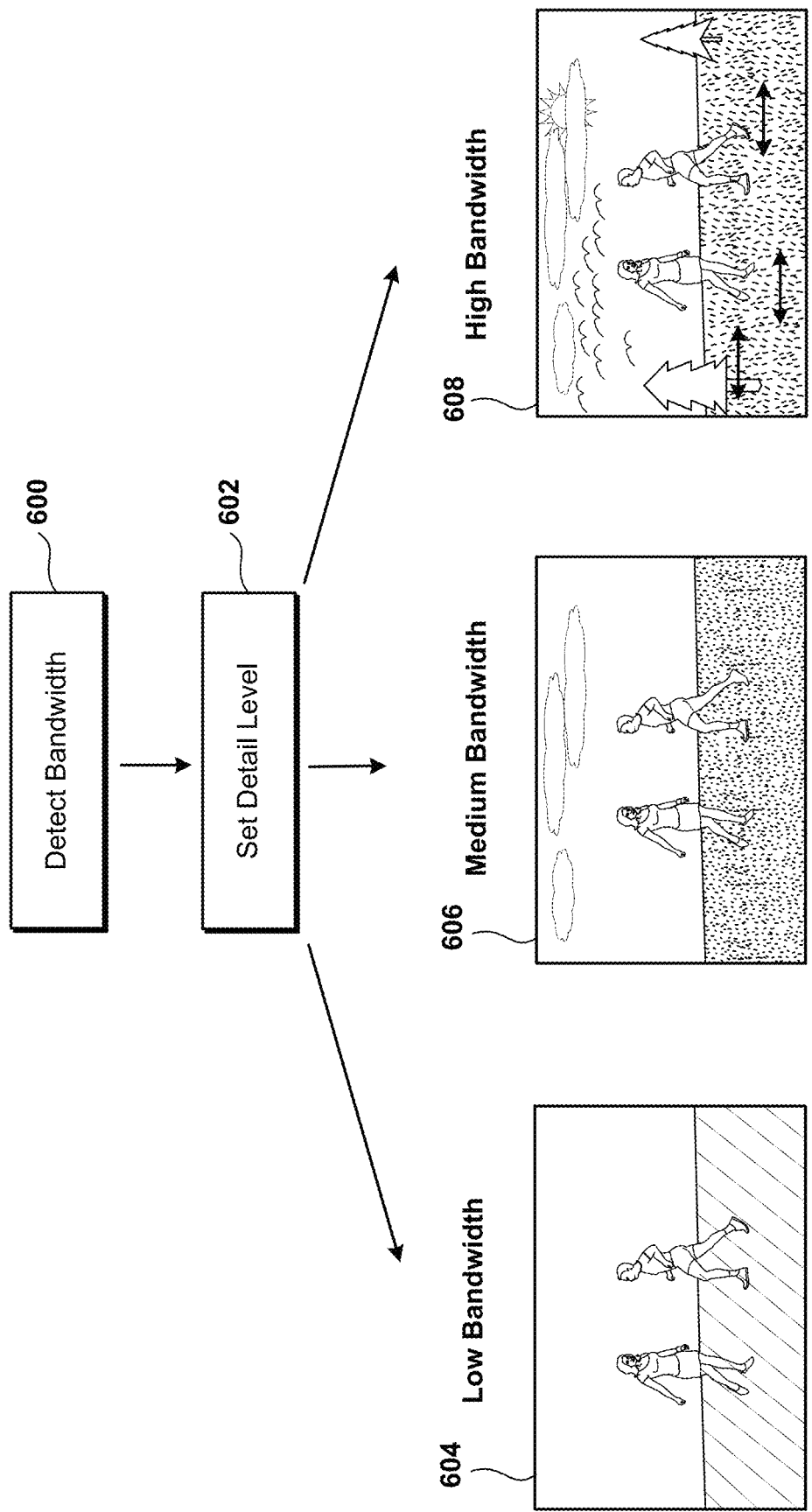
FIG. 6 conceptually illustrates several content settings based on network bandwidth feedback, in accordance with implementations of the disclosure.

In some implementations, the video game can implement different levels of content settings which determine the amount of content or detail to include. FIG. 6 conceptually illustrates several content settings based on network bandwidth feedback, in accordance with implementations of the disclosure. At operation 600, the available network bandwidth is detected. At operation 602, a level of detail is set for the video game from among several options. For example, a low-bandwidth option is shown at reference 604, wherein two characters are shown with a simple background consisting of a simple texture representing grass on which the characters are standing, and a sky with no clouds or other details shown.

For a medium-bandwidth option shown at reference 606, the grass is represented by polygons to enable individual blades of grass to be appreciated. Additionally, some clouds are shown, but drawn simplistically and with low amounts of detail.

However, for a high-bandwidth option shown at reference 608, the individual blades of grass are more numerous and dense. Further, the blades of grass can be configured to sway or move. Also, the clouds are drawn with high amounts of detail. And, there are trees visible in the high-bandwidth background, which were not previously visible at the lower detail settings. Additional vegetation can be shown, such as flowers, bushes or other types of plants.

Thus, the video game can be configured to adjust the amount of content or the level of detail of said content in response to changing network conditions or stream quality. Various adjustments can be made, such as adjusting viewing distance, texture, detail, amount of virtual elements such as vegetation, characters, vehicles, etc. Thus, the quality level of the virtual environment can be dynamically modified, which is different from previous methods, because rather than just modifying frame rates after they have already been rendered, implementations of the present disclosure provide for modification of the content itself. In some implementations, content modification by the video game can be set to various levels such as high/medium/low bandwidth alternatives, which are dynamically switched as needed. In some implementations, user preference settings can be provided, to enable the user to set preferences regarding content adjustment, such as setting relative importance levels for. For example, the user may indicate relative preference levels for aspects such as texture quality, number of objects, resolution, frame rate, etc. and the video game will prioritize the various aspects accordingly.

In some implementations, a machine learning method is applied to determine a user's preferences. For example, in some implementations the system is configured to analyze the user's game history to determine their preferences. Factors such as how good a player is, how often he/she dies, level of experience, chosen difficulty settings, combinations of game inputs that a player uses, etc. can be considered to determine user preferences.

In addition to making adjustments that affect video imagery, the video game can also adjust the audio which is being rendered by the video game. In existing cloud gaming systems, the video game delivers audio rendered at, for example, stereo, 5.1 surround sound or other high fidelity audio settings, with such settings being fixed at game startup. The audio encoder of the streaming server encodes the audio stream, and there are limited options available to adjust the audio quality. For example, if network conditions decline (e.g. the user streamed at 5.1 but now only has bandwidth for stereo) then the audio encoder would need to drop channels or downmix to stereo. Further, the audio encoder may decrease the audio bitrate. However, such adjustments are made after the audio has already been rendered. Better results can be achieved by adjusting the audio at the video game itself, rather than relying on downstream encoding adjustments.

In some implementations, the user's audio capabilities may change. For example, the user might be using a 5.1 audio setup, but halfway through the game switch to using a pair of headphones instead. In the case of such an audio capability change, then the system may trigger the video game to change its audio settings and, for example, switch from 5.1 to stereo. It will be appreciated that in various implementations the video game can be triggered to change audio settings, in response to detected changes in the user's audio capabilities or the user's listening device, to an audio setting/configuration that suits the new audio capabilities or listening device.

By enabling the video game to be involved in adjusting the audio, more intelligent decisions on audio rendering can be made, which provides a better user experience. Considering the example above, the video game rendering in 5.1 surround can switch to rendering in stereo, which provides a better experience than downmixing after the fact. Other options which can be applied in response to reduced bandwidth include limiting audio/sound effects or disabling background audio such as background music. In some implementations, sound effects can be prioritized for purposes of being dynamically turned off/on in response to user connection quality. Generally speaking, in the above described examples, audio quality is reduced by the video game in response to degraded network conditions such as reduced bandwidth. Likewise, it will be appreciated that in the opposite scenario, when network conditions improve, audio quality can be responsively increased by the video.

In some implementations, the video game can adjust the game difficulty based on network connection or stream quality (e.g. latency and bandwidth), with the goal of ensuring that the video game remains playable and enjoyable for the user. For example, the video game can be configured to be responsive to the latency between the client and the streaming server. In some implementations, latency is determined based on ping time. In some implementations, the video game can adjust its internal timings, such as when its deadline is for a given input to perform a given action (e.g. deadline for button press to make a jump or kill an enemy). For example, in some implementations, when latency increases, then internal timings are relaxed. That is, more time is allowed or the deadline is extended for a given action. Conversely, when the latency decreases, then internal timings are tightened, i.e. less time is allowed or the deadline is shortened for a given action. For example, this can have the effect of making it easier to perform actions such as attacking or killing enemies when latency increases, and conversely more difficult when latency decreases.

In some implementations, the video game increases the effect of an in-game player assistance feature (e.g. auto-aim, steering assistance, etc.), when connection quality decreases, as for example, the game may become more difficult when latency is relatively high. Conversely, in some implementations, the video game decreases the effect of the in-game player assistance feature when connection quality increases. Again, the above-described dynamic adjustment of an in-game assistance feature has the effect of making the game easier when network conditions are reduced, and more difficult when network conditions improve. The helps to maintain a given level of fairness for the user.

In some implementations, game difficulty can be adjusted in response to the user's device type. For example, playing the video game on a phone using touch controls can be more difficult than playing on a game console using a controller. And thus, it can helpful to adjust (reduce) the game difficulty when the user switches from using one type of device to a different type of device.

In some implementations, the video game can be configured to temporarily pause the game when user connection quality or stream quality is especially poor, or drops below a minimum threshold level (e.g. user is using 4G/5G cellular data network on their cell phone and is temporarily in a spot with poor reception, such as on a train going through a tunnel). Likewise, the video game can be configured to unpause the game when connection/stream quality returns to an acceptable level. In some implementations, an advertisement can be shown while the game is paused, with the advertisement having been transmitted to, and stored at, the user device in advance of encountering the poor connection/stream quality situation.

In other implementations, the video game is intentionally paused by the system so as to enable presentation of an advertisement (rather than in response to poor connection quality).

In various implementations, the streaming server and the video game may interact in different ways to adjust the video or audio based on changing connection/stream quality. By way of example without limitation, there may be target bit rate for the video encoder or audio encoder based on monitored packet loss. In some implementations, the video game is first engaged to make adjustments, and then if the adjustments by the video game are not sufficient, then the video encoder or audio encoder is engaged to make further adjustments (e.g. scaling, dropping frames, adjusting encoder settings to lower bit rate, QP settings, etc.). In a sense, the streaming server can fall back to its own mechanisms in the case that the adjustments by the video game itself are insufficient for the current connection quality.

In some implementations, the streaming server first performs certain adjustments, and then if the adjustments by the streaming server are not sufficient, then the video game is engaged to perform adjustments.

In some implementations, both the video game and the streaming server are configured to substantially simultaneously initiate adjustments in response to changed connection quality.

In some implementations, there can be thresholds for engagement of either or both of the video game and the streaming server to perform adjustments in response to connection quality. For example, in some implementations, if latency exceeds a given threshold, then this triggers engagement of the video game to perform adjustments.

In some implementations, the streaming server can be logically set depending on the game. That is, each game can define settings that govern the type and quantity of adjustments that will be made by the video game versus the streaming server. In some implementations, the game provides a configuration file which contains presets for the particular game. The configuration file may provide priority for certain settings, to either or both of the game engine of the video game and the streaming server. For example, a first-person shooter game may prioritize frame rate over resolution, whereas a puzzle game may prioritize resolution rather than frame rate.

In some implementations, the streaming server determines when to invoke adjustments by the video game, and in some implementations, further determines what types of adjustments for the video game to make, as it is monitoring connection quality with the client.

Figure 7:
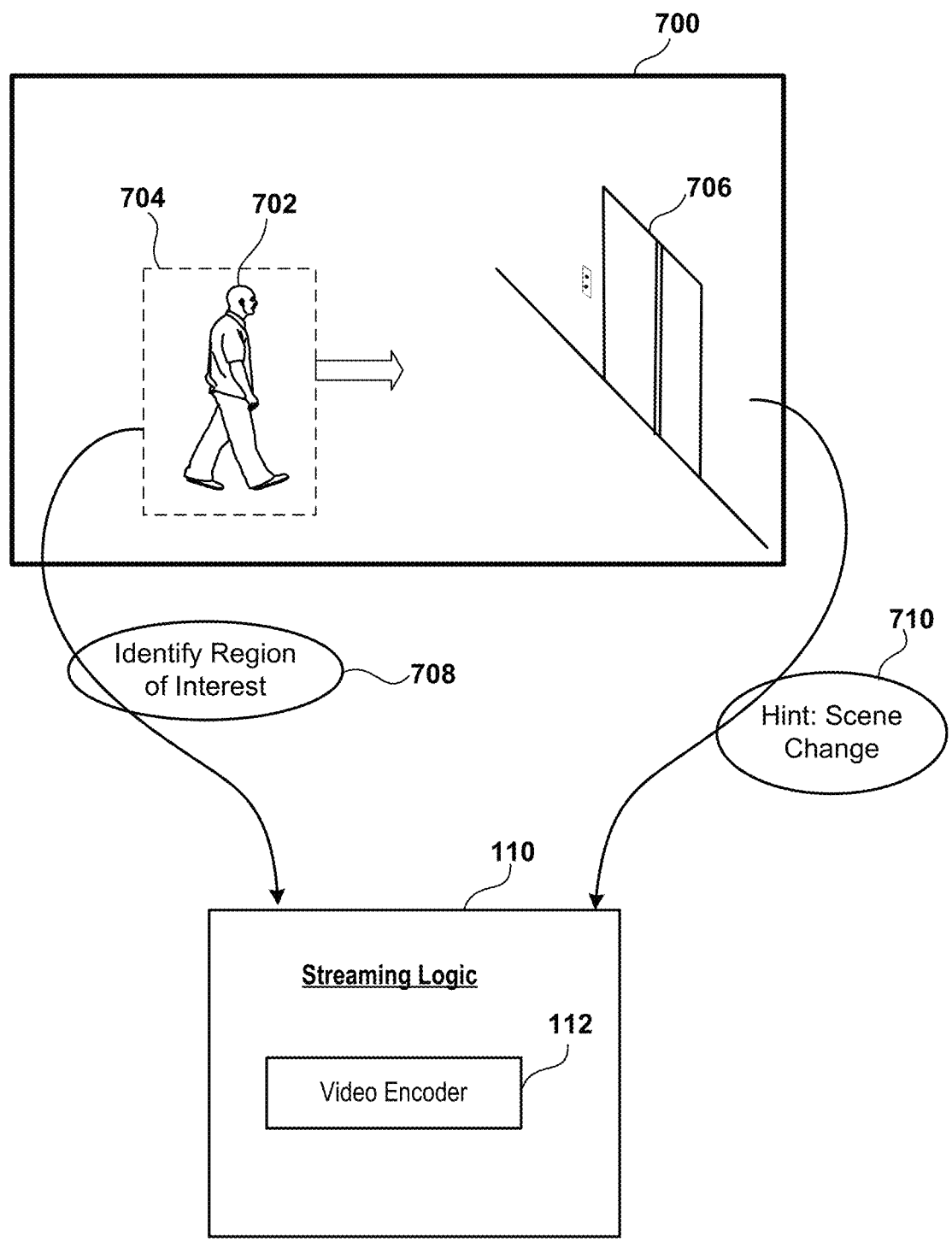
FIG. 7 conceptually illustrates a feed-forward optimization from the video game to the streaming logic, in accordance with implementations of the disclosure.

While implementations described herein provide streaming optimization based on feedback from the client or streaming software back to the video game, there can also be a feed-forward path in which the video game provides information to the streaming server or client to enable streaming optimization. FIG. 7 conceptually illustrates a feed-forward optimization from the video game to the streaming logic, in accordance with implementations of the disclosure. A scene 700 of a video game is conceptually shown, including a virtual character 702 and a door/elevator 706.

In some implementations, the video game can inform the video encoder about regions of interest. The video game can be configured to determine which parts of the video frames are changing, and can inform the streaming server, so that the video encoder can focus on the parts that are changing. In existing game streaming systems, the video encoder assigns a certain amount of bits to all different parts of the video frames, as it is not known which part may change. However, if there is no screen change in, say three quarters of the frame, then the video game will not be sending data for those unchanging portions, and the allocated bits for those unchanging portions are not necessary. Thus in contrast to existing systems, in some implementations, the video encoder can allocate bits (that would otherwise have been unnecessarily allocated to unchanging portions) to areas of the screen that are experiencing a change, and those areas can have better image quality as a result. This allocation of bits is based on the streaming server receiving information from the video game itself identifying regions of interest or regions that are changing. Moreover, even if the entire scene may be changing, e.g. due to panning of the view, identification of the region of interest can be useful to enable the video encoder to prioritize certain regions over others, such as regions that are likely to be focused upon by the user (e.g. regions where their character is located, regions they are targeting, regions where activity is occurring, etc.).

With continued reference to FIG. 7, in the illustrated implementation, a region of interest 704 is identified by the video game (ref. 708), which is the region in which the virtual character 702 is located. The region can be identified by the video game based on the location of the virtual character 702 and further based on the virtual character's movements. For example, the region of interest can be identified to include areas that the virtual character is moving towards, or areas where an interaction is likely to occur. The identified region of interest 704 is communicated to the streaming logic 110, and used by the video encoder 112 to prioritize encoding quality for the region of interest.

Another challenge for the video encoder in existing streaming systems occurs when there is a scene change, as the encoder is not aware and just "sees" a large amount of changes in the frame (e.g. p-frames received are much larger in size). Scene changes are thus challenging because the frames may become too large to handle expediently, and it may take some time for the image to stabilize because of so many changes. The result is that it may take many frames to restore the image quality back to where it was before the scene change, during which the user experience is degraded. However, in accordance with implementations of the disclosure, the video encoder can be informed by the video game that a scene change is coming up, or that the current frame is part of a scene change. This information can be utilized by the video encoder, for example to determine how to allocate its bit budget.

In the illustrated implementation, the virtual character 702 is moving towards the door/elevator 706. When the virtual character 702 reaches the door 706 there will be a scene change. The video game determines that the scene change is likely to occur soon, and communicates this information to the streaming logic 110 (ref. 710). This information is utilized by the video encoder 112 to adjust its encoding settings (e.g. allocating bit budget to handle impending scene change).

In some implementations, the operating system of the game machine/system can derive certain "feed-forward" information as well. This can be especially helpful for games which are not modified to provide feed-forward information, and/or may provide additional clues to the streaming logic. For example, a process can monitor what files on disk the game is accessing (e.g. could indicate loading of a new level or other event) or the throughput of the hardware/ssd (e.g. sudden change in throughput may indicate scene change or other event). In some implementations the process may monitor what area of memory the video game is accessing.

In some implementations a profile of the game based on these system level indicators can be generated (e.g. by a QA operator). The system level indicators can be used as markers to determine where the user is in the game. Accordingly, appropriate reference settings for the video game can be picked based on the indicators, and stored to the profile. For example, the profile may map various ones of the indicators to certain reference settings, so that when the indicators have certain values, then the video game is instructed to adjust its video/audio rendering according to the reference settings. Different areas of the game can have different settings. For example, if the user is in a battle (e.g. inferred from storage access, machine learning of the video images, machine learning on audio data, rate at which user presses buttons/sticks) then framerate could be prioritized. Whereas if the user is in a fairly static region or exhibits low activity, then resolution or another video property might instead be prioritized.

In some implementations, a data channel can extend from the video game to the streaming server to the client, so that the video game can send content to the client, e.g. to draw an overlay or send code/script to provide some client logic. The video game would feed forward to the streaming server which then feeds forward to the client. For example, the video game could send shared assets, e.g. to draw an overlay for items such as status information, player health, an accomplishment like beating a boss. In some implementations, data may be sent of the data channel to enable client-side drawing of a touch interface. In some implementations, code sent over the data channel to the client can be configured to render a timer, e.g. clock counting down that game will finish in ten seconds. In some implementations, the data channel can be used for peripherals, such as microphones, cameras or game specific peripherals, to provide a way for the video game to control the handling of the peripheral.

Such a data channel would consume a certain amount of available bandwidth, so in some implementations, the streaming logic may communicate to the video game the amount of bandwidth available for the data channel. In some implementations, the video game can set a priority setting or deadline for information to be communicated to the client. In some implementations, the rate at which packets for the data channel are propagated can be adjusted if needed, for example to maintain a certain amount of bandwidth available for streaming of video/audio.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("TOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 8A:
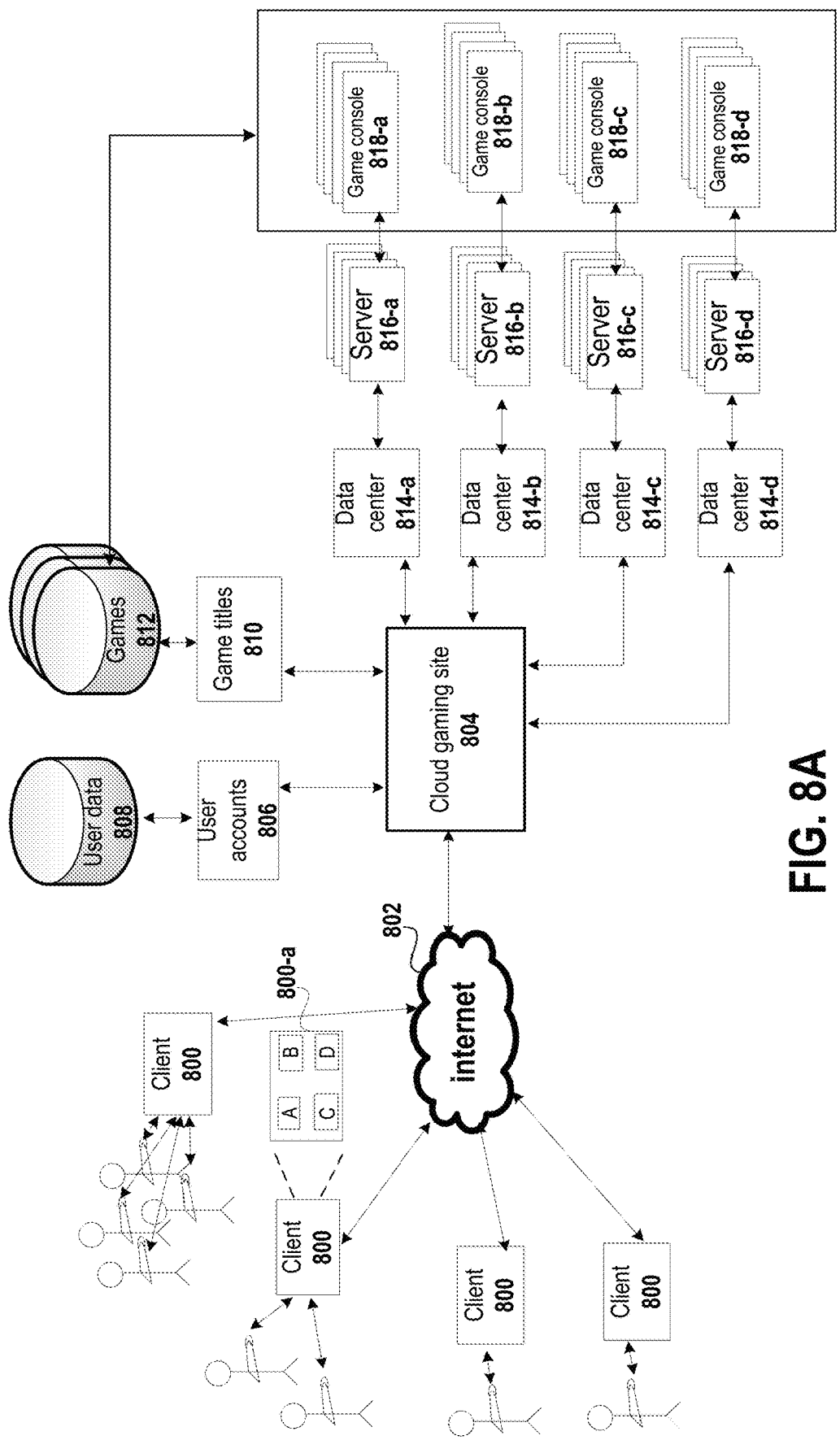
FIG. 8A illustrates an exemplary system used to load game files for a game available through a cloud gaming site, in accordance with implementations of the disclosure.

FIG. 8A illustrates an exemplary system used to load game files for a game available through a cloud gaming site. The system includes a plurality of client devices 800 that are communicatively connected to the cloud gaming site 804 over a network 802, which can include a LAN, wired, wireless, cellular (e.g. 4G, 5G, etc.), or any other type of data network, including the Internet. When a request to access the cloud gaming site 804 is received from a client device 800, the cloud gaming site 804 accesses user account information 806 stored in a user data store 808 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 810 to identify the game titles that are available at the game cloud site for the user account initiating the request. The game titles data store 810, in turn, interacts with a games database 812 to obtain the game titles for all the games that are available for the cloud gaming site. As new games are introduced, the games database 812 will be updated with the game code and the game titles data store 810 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 800-a, as shown in FIG. 8A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 8B:
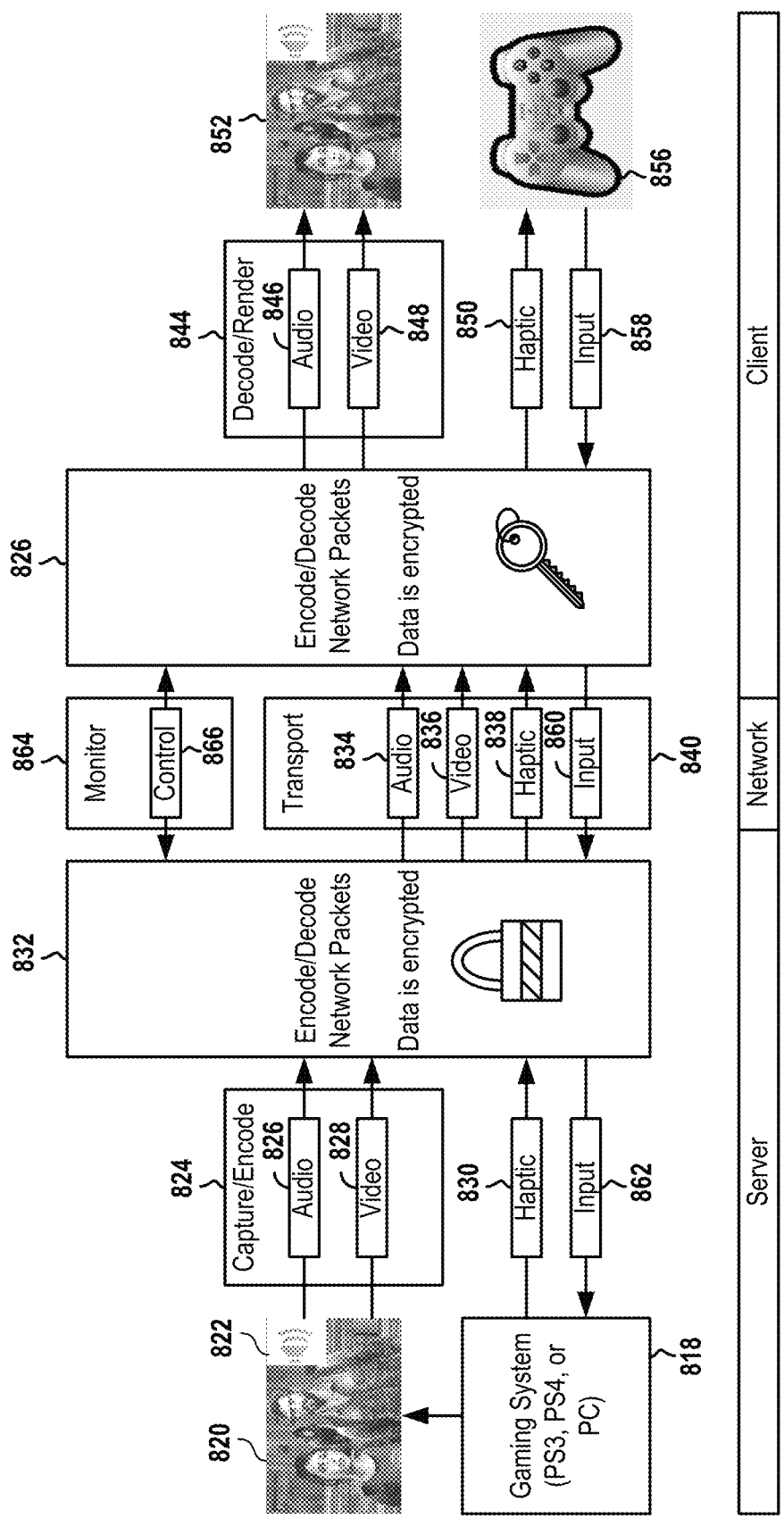
FIG. 8B is a flow diagram conceptually illustrating various operations which are performed for streaming a cloud video game to a client device, in accordance with implementations of the disclosure.
Figure 9:
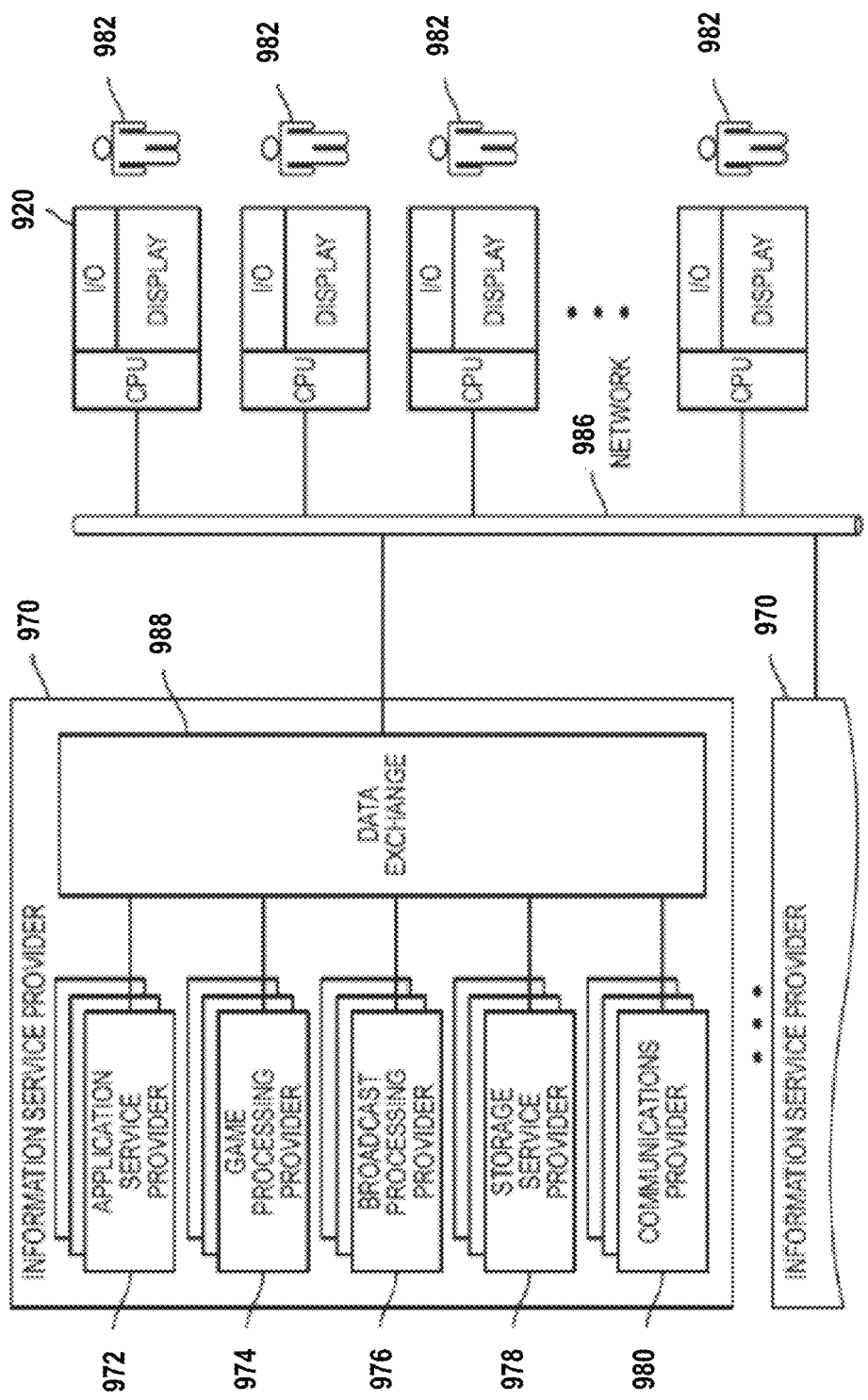
FIG. 9 illustrates an embodiment of an Information Service Provider architecture, in accordance with implementations of the disclosure.

FIG. 8B is a flow diagram conceptually illustrating various operations which are performed for streaming a cloud video game to a client device, in accordance with implementations of the disclosure. The gaming system 818 executes a video game and generates raw (uncompressed) video 820 and audio 822. The video 820 and audio 822 are captured and encoded for streaming purposes, as indicated at reference 824 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 826 and encoded video 828 are further packetized into network packets, as indicated at reference numeral 832, for purposes of transmission over a network such as the Internet. The network packet encoding process can also employ a data encryption process, thereby providing enhanced data security. In the illustrated implementation, audio packets 834 and video packets 836 are generated for transport over the network, as indicated at reference 840.

The gaming system 818 additionally generates haptic feedback data 830, which is also packetized into network packets for network transmission. In the illustrated implementation, haptic feedback packets 838 are generated for transport over the network, as further indicated at reference 840.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 840, the audio, video, and haptic feedback packets are transported over a network, such as and/or including the Internet. As indicated at reference 842, the audio packets 834, video packets 836, and haptic feedback packets 838, are decoded/reassembled by the client device to define encoded audio 846, encoded video 848, and haptic feedback data 850 at the client device. If the data has been encrypted, then the network packets are also decrypted. The encoded audio 846 and encoded video 848 are then decoded by the client device, as indicated at reference 844, to generate client-side raw audio and video data for rendering on a display device 852. The haptic feedback data 850 can be processed/communicated to produce a haptic feedback effect at a controller device 856 or other interface device through which haptic effects can be rendered. One example of a haptic effect is a vibration or rumble of the controller device 856.

It will be appreciated that a video game is responsive to user inputs, and thus, a similar procedural flow to that described above for transmission and processing of user input, but in the reverse direction from client device to server, can be performed. As shown, a user operating controller device 856 may generate input data 858. This input data 858 is packetized at the client device for transport over the network to the cloud gaming system. The input data packets 860 are unpacked and reassembled by the cloud gaming server to define input data 862 on the server-side. The input data 862 is fed to the gaming system 818, which processes the input data 862 to update the game state of the video game.

During transport (ref. 840) of the audio packets 834, video packets 836, and haptic feedback packets 838, the transmission of data over the network can be monitored to ensure the cloud game stream quality of service. For example, network conditions can be monitored as indicated by reference 864, including both upstream and downstream network bandwidth, and the game streaming can be adjusted in response to changes in available bandwidth. That is, the encoding and decoding of network packets can be controlled based on present network conditions, as indicated by reference 866.

FIG. 10 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
   executing a video game by a cloud game machine, the execution of the video game includes rendering gameplay video and gameplay audio;
   processing the rendered gameplay video and gameplay audio by a streaming server for streaming over a network to a client device, wherein processing the gameplay video by the streaming server includes encoding the rendered gameplay video in a compressed video format;
   monitoring connection quality over the network between the streaming server and the client device, wherein monitoring connection quality includes monitoring packet loss occurring during the streaming of the gameplay video;

responsive to detecting a change in the connection quality between the streaming server and the client device, then adjusting the rendering of the gameplay video and gameplay audio by the cloud game machine, wherein adjusting the rendering includes adjusting an amount of virtual objects to be rendered in the gameplay video based on a pre-defined priority ranking of the virtual objects for inclusion in, and exclusion from, the rendered gameplay video, the pre-defined priority ranking defining an order in which the virtual objects will be included in, and excluded from, a scene depicted by the gameplay video in response to changes in the connection quality, and wherein adjusting the rendering of the gameplay video by the cloud game machine includes adjusting a frame rate or a resolution for the gameplay video, and wherein adjusting the rendering of the gameplay audio by the cloud game machine includes adjusting one or more of an audio configuration, a sound effect, or background audio;

wherein adjusting the rendering further includes causing the cloud game machine to modify, based on an amount of said change in the connection quality, an effect associated with an in-game player assistance feature.

2. The method of claim 1, wherein adjusting the rendering of the gameplay video by the cloud game machine includes adjusting a level of detail for the rendering of the gameplay video.

3. The method of claim 1,
wherein the change in the connection quality is defined by a degradation in the connection quality;
wherein adjusting the rendering of the gameplay video by the cloud game machine is configured to reduce a bit rate of the streaming of the gameplay video over the network.

4. The method of claim 1,
wherein the change in the connection quality is defined by an improvement in the connection quality;
wherein adjusting the rendering of the gameplay video by the cloud game machine is configured to increase a bit rate of the streaming of the gameplay video over the network.

5. The method of claim 1, wherein detecting the change in the connection quality triggers transmission of a message from the streaming server to the cloud game machine, and wherein the adjusting of the rendering of the gameplay video by the cloud game machine is responsive to said message.

6. A system, comprising:
a cloud game machine that executes a video game, the execution of the video game includes rendering gameplay video;
a streaming server that processes the rendered gameplay video for streaming over a network to a client device, wherein the streaming server monitors connection quality over the network between the streaming server and the client device;
wherein responsive to detecting a change in the connection quality between the streaming server and the client device, then the rendering of the gameplay video and a game difficulty of the video game are adjusted by the cloud game machine, wherein the game difficulty is adjusted by adjusting a timing deadline for an input to perform an action in the video game, wherein adjusting the game difficulty further includes modifying an effect associated with an in-game player assistance feature, wherein adjusting the rendering includes adjusting an amount of virtual objects to be rendered in the gameplay video based on a pre-defined priority ranking of the virtual objects for inclusion in, and exclusion from, the rendered gameplay video, the pre-defined priority ranking defining an order in which the virtual objects will be included in, and excluded from, a scene depicted by the gameplay video in response to changes in the connection quality, and wherein the adjusting the rendering uses a user preference setting that indicates relative preference levels for aspects of the rendering by the game engine.

7. The system of claim 6, wherein processing the gameplay video by the streaming server includes encoding the rendered gameplay video in a compressed video format.

8. The system of claim 6, wherein monitoring connection quality includes monitoring one or more of bandwidth or latency.

9. The system of claim 6, wherein monitoring connection quality includes monitoring packet loss occurring during the streaming of the gameplay video.

10. The system of claim 6, wherein adjusting the rendering of the gameplay video by the cloud game machine includes adjusting a frame rate or a resolution for the gameplay video.

* * * * *